United States Patent [19]

Pittet et al.

[11] E Re. 29,843

[45] Reissued Nov. 21, 1978

[54] SUBSTITUTED THIAZOLES AND FLAVORING PROCESSES AND PRODUCTS PRODUCED THEREBY

[75] Inventors: Alan O. Pittet, Atlantic Highlands; Denis E. Hruza, Bricktown, both of N.J.

[73] Assignee: International Flavors & Fragrances Inc., New York, N.Y.

[21] Appl. No.: 807,054

[22] Filed: Jun. 16, 1977

Related U.S. Patent Documents

Reissue of:

[64] Patent No.: 3,769,040
Issued: Oct. 30, 1973
Appl. No.: 88,186
Filed: Nov. 9, 1970

[51] Int. Cl.[2] ..... A23L 1/22; A23L 1/231; A24B 3/12

[52] U.S. Cl. ..... 426/535; 131/17 R; 131/144; 252/522

[58] Field of Search ..... 426/534, 535, 536, 537; 131/17 R, 144; 252/522

[56] References Cited

U.S. PATENT DOCUMENTS

| | | | |
|---|---|---|---|
| 2,870,158 | 1/1959 | Asinger | 260/302 R |
| 3,681,088 | 8/1972 | Katz | 426/535 |

FOREIGN PATENT DOCUMENTS 6,812,899 3/1969 Netherlands.

OTHER PUBLICATIONS

R. L. Hall et al., Food Technology, 24(5), 25–28, 30–32, 39 (May 1970).
Chemical Abstracts, 82:170,885c (1975).
Chemical Abstracts, 71:11875f (1969).
Chemical Abstracts, 67:7782y (1967).
Asinger et al., II Chem. Abst., 64:5063(d), (1966).
Tarbell et al., "2-methyl-5-ethoxythiazole and Related Compounds," J. Am. Chem. Soc., vol. 72, (1950), pp. 3,138–3,140.
Klein et al., "Uber 2-Thiazolon," Helv. Chim. Acta., vol. 37, (1954), pp. 2,057–3,063.

*Primary Examiner*—Sidney Marantz
*Attorney, Agent, or Firm*—Arthur L. Liberman; Harold Haidt; Franklin D. Wolffe

[57] ABSTRACT

Processes for altering the flavors and/or fragrances of materials which comprise adding thereto effective amounts of at least one thiazole having the formula:

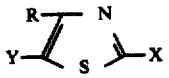

wherein R is hydrogen, alkyl, or acyl; X is *alkyl*, alkoxy, *or* hydrogen, [or when R and Y are alkyl, alkyl;] and Y is alkyl, acyl, alkoxy or hydrogen, no more than two of R, X and Y being hydrogen; *with the proviso that X is alkyl only when either (i) R and Y are each alkyl or (ii) Y is alkoxy;* compositions containing such thiazoles and compositions; perfumed materials containing such thiazoles and compositions; and novel thiazoles and processes for producing same.

9 Claims, No Drawings

SUBSTITUTED THIAZOLES AND FLAVORING PROCESSES AND PRODUCTS PRODUCED THEREBY

Matter enclosed in heavy brackets [ ] appears in the original patent but forms no part of this reissue specification; matter printed in italics indicates the additions made by reissue.

BACKGROUND OF THE INVENTION

The present invention relates to certain substituted thiazoles and their use in processes and compositions for altering the flavors and aromas of various materials such as tobaccos, foodstuffs, and the like, as well as certain novel thiazoles and processes for producing them.

Because of the tremendous consumption of foods, tobaccos, and other materials, there has been an increasing interest in substances and methods for imparting flavors to such consumable materials. This interest has been stimulated not only because of the inadequate quantity of natural flavoring materials available, but perhaps even more importantly, because of the need for materials which can convey certain nuances, will be more stable than natural materials, will blend better with other flavors or flavoring composition components, and will generally provide superior products. Moreover, new olfactory agents are in demand for various reasons.

There have recently been suggestions that thiazole derivatives have flavors which might be useful in foods and other consumable materials. For example, alkyl (4-methyl-thiazo-2-yl) carbinols and ketones have been suggested for use in fruity flavors. 4- and 5-Hydroxyalkylthiazoles have also been suggested for flavor use, as have certain 2-alkyl and -acylthiazoles and 2,4- or 2,5-dialkylthiazoles.

THE INVENTION

It has now been found that certain substituted thiazoles are capable of imparting a wide variety of flavors and fragrances to various consumable materials. Briefly, the invention contemplates altering the flavors and/or fragrances of materials by adding thereto a small but effective amount of at least one thiazole having the formula:

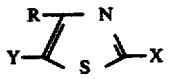

wherein R is hydrogen, alkyl, or acyl; X is *alkyl, alkoxy, or* hydrogen, [or when R and Y are alkyl, alkyl]; and Y is alkyl, acyl, alkoxy or hydrogen, and no more than two hydrogen atoms are substituent on the thiazole ring; *with the proviso that X is alkyl only when either (i) R and Y are alkyl or (ii) Y is alkoxy.* The invention also contemplates novel flavoring and fragrances compositions comprising such thiazoles.

More specifically, the present invention contemplates di- and trisubstituted thiazoles, particularly mono- and dialkylalkoxythiazoles, and mono- and dialkylacylthiazoles, and di- and trialkylthiazoles. Such di- and trisubstituted thiazoles can be represented by the formula

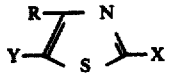

wherein R is hydrogen or alkyl, X is *alkyl,* alkoxy *or* hydrogen, [or when R and Y are alkyl, alkyl] and Y is alkyl, acyl, alkoxy, or hydrogen, no more than one hydrogen is substituent on the thiazole ring; *with the proviso that X is alkyl only when either (i) R and Y are alkyl or (ii) Y is alkoxy.*

Monosubstituted thiazoles which have also been found to be useful in the preparation of consumable materials are represented according to the formula

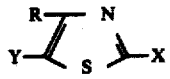

wherein R is acyl or hydrogen and X and Y are alkoxy or hydrogen, two hydrogen atoms being substituent on the ring. The desirable acyl and alkoxy groups are as described above.

The desirable alkyl, aliphatic acyl, and alkoxy groups for use herein are lower alkyl, and groups containing from one to four carbon atoms are preferred. As will be further disclosed hereinafter, the present invention contemplates the use of primary and secondary alkyl groups in various aspects.

Exemplary of thiazoles useful in the preparation of consumable materials according to various preferred aspects of the present invention are 4-methyl-5-acetylthiazole, a colorless liquid boiling at 98° C and 9 mm Hg, having the formula

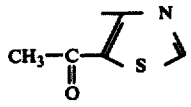

an earthy peanut aroma, and a sulfury, roasted nut flavor with a bitter overtone; trimethylthiazole, a colorless liquid boiling at 41° C and 2.2 mm Hg, having the formula

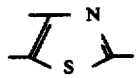

and dark chocolate and light green flavor and aroma notes; 2,4-dimethyl-5-acetylthiazole, a yellow liquid boiling at 79° C and 1.8 mm Hg, having the formula

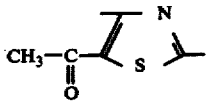

a meaty, sulfur fragrance, and a boiled beef flavor; 2,4-dimethyl-5-ethylthiazole, a colorless liquid boiling at 49° C and 7 mm Hg, having the formula

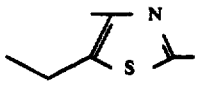

a Buchu leaf oil odor, and a meaty, liver flavor; 2-methyl-5-methoxy-4-isobutylthiazole, a colorless liquid boiling at 69 - 70° C and 2.2 mm Hg, having the formula

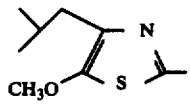

a pepper, onion aroma, and a pepper, vegetable flavor; 5-methoxy-4-isobutylthiazole, a colorless liquid boiling at 92 - 93° C and 10 mm Hg, having the formula

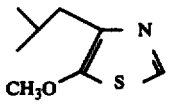

and a vegetable soup minestrone fragrance and pepper, onion, celery, and green vegetable flavor characteristics; and 2-methyl-5-methoxythiazole, a colorless liquid boiling at 33° C and 0.5 mm Hg, having the formula

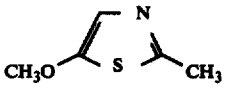

and a green, nut-like, vegetable flavor and aroma; 4-isobutyl-5-ethoxythiazole, a colorless liquid boiling at 80 - 81° C and 10 mm Hg, having the formula

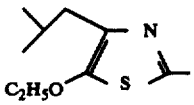

and a powerful cucumber, green pepper, onion, earthy aroma; 2-methyl-4-isobutyl-5-ethoxythiazole, a colorless liquid boiling at 126 - 127° C and 30 mm Hg, having the formula

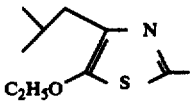

and a fatty, sour, green vegetable flavor; 2-methoxythiazole, a colorless liquid boiling at 22° C and 1.8 mm Hg, having the formula

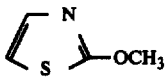

and a cereal, bread, caramel aroma; 2-ethoxythiazole, a colorless liquid boiling at 32° C and 2 mm Hg, having the formula

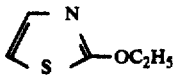

and a strong, burnt peanut-roasted meat aroma; 5-methoxythiazole, a colorless liquid boiling at 27° C and 0.9 mm Hg, having the formula

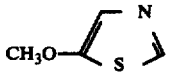

s and a roast meat, fried onion, roast vegetable odor; 5-ethoxythiazole, a colorless liquid boiling at 94 - 96° C and 30 mm Hg, having the formula

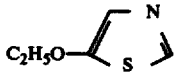

and a green, nut-like cooked vegetable flavor; and 4-acetylthiazole, a white crystalline solid, having the formula

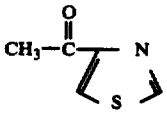

and a baked bread, nut-like, slightly meaty flavor.

It will accordingly be appreciated by those skilled in the art that the present invention provides novel thiazoles according to the formula

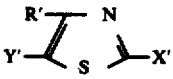

wherein when there is no more than one hydrogen atom substituent on the ring R' is alkyl or hydrogen, X' is alkyl or hydrogen, and Y' is alkyl, acyl, or alkoxy and when two hydrogen atoms are substituent on the ring, one of X' and Y' is ethoxy. The preferred alkyl, acyl and alkoxy groups are lower alkyl groups, desirably those containing up to four carbon atoms. The preferred groups are primary or secondary.

The 2-alkoxythiazoles are prepared by the reaction of a 2-halothiazole with a metal alkoxide, preferably an alkali metal alkoxide, in alcohol under reflux conditions. Preferred 2-halothiazoles are 2-chlorothiazoles and 2-bromothiazoles which can be prepared from 2-aminothiazole by the Gattermann reaction (G. Vernin and J. Metzger, Bull Soc. Chim France 1963, 11, 2504). Thus, for the preparation of 2-methoxythiazole, the 2-halothiazole is reacted with sodium or potassium methoxide in anhydrous methanol under reflux conditions (G. Klein & B. Prinjs, Helv. Chim. Acta, 37, 2057). The time of reaction is desirably between 1 and 24 hours.

Higher 2-alkoxythiazoles such as 2-ethoxy-, 2-isopropoxy-, and 2-butoxythiazoles are similarly prepared from 2-halothiazole by reaction with the appropriate metal alkoxide in the corresponding alcohol at reflux temperatures. The amount of metal alkoxide is desirably at least stoichiometric to the 2-halothiazole and is preferably in one to two molar excess.

When the reaction is complete, the alcohol is evaporated and the residue obtained is dissolved in water and extracted one to five times with an organic solvent such as diethyl ether, methylene chloride, chloroform, benzene and the like. The combined solvent extracts are dried and the solvent removed by distillation to yield the 2-alkoxythiazole.

2-Methoxythiazole can also be prepared by the methylation of 2-hydroxythiazole.

The 5-alkoxythiazoles are desirably prepared by the cyclization of α-acylaminoesters with phosphorus pentasulfide, as per D. S. Tarbell, H. P. Hirshler and R. B. Carlin, J. Am. Chem. Soc. 72, 3138 (1950). The α-acylaminoesters having the formula

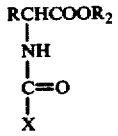

where R and X are hydrogen or alkyl and $R_2$ is alkyl, are reacted with phosphorus pentasulfide to produce substituted 5-alkoxythiazoles having the following general structure

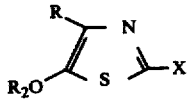

The α-acylaminoesters are prepared from the corresponding α-amino acid by esterification, acylation of the resulting ester with the appropriate acid anhydride, or, in the case of N-Formyl derivatives, with a mixture of formic acid, sodium acetate, and acetic anhydride.

The alkoxythiazole derivative is prepared by heating the α-acyaminoester with the phosphorus pentasulfide on a steam bath while excluding moisture. It is desirable to carry out the reaction in an inert reaction vehicle, preferably utilizing a solvent such as chloroform or benzene since the reaction mixture becomes viscous and lumpy and causes the reaction to get out of control. When a vehicle is used, the reaction is desirably carried out at the reflux temperature. The reaction mixture is heated for 48 hours to complete the reaction. If lower temperatures are used, longer reaction times of up to seven days are needed.

Temperatures of 50° to 150° C and reaction times of 5 to 150 hours are desirable. It is preferred to carry out the reaction at 60° to 90° C for 10 to 50 hours.

At the completion of the reaction, the solution is cooled and made basic preferrably with sodium or potassium hydroxide. Alkaline carbonates may also be used. The alkoxythiazole derivative, usually isolated as a solution in the vehicle, is separated from the aqueous layer. After drying, the solvent is stripped off and the product isolated and purified further as described herein.

Using the method described above the following 5-alkoxythiazoles are prepared from the corresponding α-acylaminoesters:

5-Methoxythiazole from N-formylglycine methyl ester

4-Isobutyl-5-methoxythiazole from N-formylleucine methyl ester

2-Methyl-4-isobutyl-5-methoxythiazole from N-acetylleucine methyl ester

2-Methyl-4-isobutyl-5-ethoxythiazole from N-acetylleucine ethyl ester

4-Isobutyl-5-ethoxythiazole from N-formylleucine ethyl ester

2-Methyl-5-methoxythiazole from N-acetylglycine methyl ester

2-Methyl-5-ethoxythiazole from N-acetylglycine ethyl ester

2-Methyl-4-isopropyl-5-propoxythiazole from N-acetylvaline propyl ester

2-Methyl-5-butoxythiazole from N-acetylglycine butyl ester 2,4-dimethyl-5-methoxythiazole from N-acetylalanine methyl ester Alkylsubstituted thiazoles are prepared by reacting an α-haloketone or aldehyde with a thioamide; Hautzsch et al Ann. 249 1 (1888); 250 257, 281 (1889); 259, 228, 253 (1890); and Hromatka, U.S. Pat. No. 2,160,867. The reaction scheme is shown:

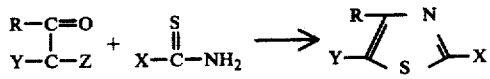

wherein R, X, and Y are hydrogen or alkyl, and Z is a halo atom, preferably chloro or bromo.

Examples of α-halo ketones are 3-bromo-2-butanone, 3-chloro-2-pentanone, 3-bromo-2-hexanone, chloroacetone, and 1-chloro-2-butanone. Examples of α-haloaldehydes are chloroacetaldehyde, 2-bromopropionaldehyde, and 2-bromoisovaleraldehyde. Examples of thioamides are thioformamide, thioacetamide, thiopropionamide, and thioisovaleramide. The thioamides are readily prepared from the corresponding amide by reaction with phosphorus pentasulfide [Schwartz, Organic Synthesis 25, 35 (1945)].

The thiazoles are prepared by heating a mixture of amide, phosphorus pentasulfide, and α-halo compound. Thus the reaction of thioformamide with 3-chloro-2-pentanone will yield 4-methyl-5-ethylthiazole; and thioacetamide and 3-bromo-2-butanone react to form trimethylthiazole.

The thioamide and the α-halo carbonyl compound are warmed to initiate the reaction which thereupon proceeds spontaneously. External cooling is sometimes desirable, as the reaction is strongly exothermic. A preferred method is to use an inert vehicle to aid in the control of the reaction. Preferred vehicles include solvents such as ethanol, benzene, and the like. When an inert vehicle is used, the preferred temperature is the reflux temperature of the vehicle. The desirable temperature range is between 50° and 150° C, with the range of 80 to 100° C preferred.

The time of reaction will be dependent on the temperature of the reaction and will be between 30 minutes and 10 hours. The preferred reaction time is from 2 to 5 hours.

At the completion of the reaction, the reaction mixture is cooled and the organic solvent layer is discarded. The aqueous layer is made alkaline with base and the thiazole produced is extracted with an organic solvent such as diethyl ether, methylene chloride, chloroform, benzene, or the like. The solvent extract is dried and the solvent evaporated to yield the thiazole which can be further purified as described herein.

Alkylated thiazoles which are unsubstituted in the 2-position can be prepared by the reaction of an α-haloketone with ammonium dithiocarbamate, desirably in the presence of vehicle to control the exothermic reaction. Thus, a solution of ammonium dithiocarbamate in an inert vehicle such as methanol, ethanol, hydrocarbons, ether, and the like is cooled to 0° C, and the α-halocarbonyl is added dropwise with stirring. The temperature of the reaction mixture can be between −30° to +30° C, and the preferred temperature range is −10° to 10° C. The molar ratio of the ammonium dithiocarbamate to the α-halocarbonyl compound is at least 1:1. Preferably an excess of the ammonium dithiocarbamate is used, e.g., 1:1.1 or 1:1.5.

When the addition is complete the reaction mixture is allowed to warm to room temperature and is held overnight at that temperature. The reaction is completed by heating the mixture for one hour. The vehicle is then removed, preferably by evaporation, the residue is taken up in water, and the crystalline 2-mercaptothiazole derivative is collected by filtration.

The mercapto compound is then added to concentrated hydrochloric acid cooled to 0°, and the temperature is maintained at 60 - 70° C while hydrogen peroxide is added dropwise. Temperatures in excess of 70° cause the reaction to be uncontrollable and result in low yields of product. Temperature below 60° C cause the reaction time to be excessively long with incomplete oxidation.

When the addition is complete the reaction mixture is made alkaline preferably with an alkali metal hydroxide such as sodium or potassium hydroxide, and the product is extracted with an organic solvent such as diethyl ether, benzene, chloroform and the like. The solvent is then removed preferably by evaporation, and the thiazole is isolated and further purified as described herein.

4-Acylthiazoles are prepared by procedures described for the preparation of alkylsubstituted thiazoles except that a γ-halo-α,β-diketone is employed rather than a α-halo carbonyl compound. Examples of suitable γ-halo-α,β-diketones are 1-chloro-2,3-butanedione, 2-bromo-3,4-hexanedione, and 4-bromo-2,3-pentanedione.

It will be appreciated that reaction of 1-chloro-2,3-butanedione with thioformamide will lead to 4-acetylthiazoles, similarly, reaction of 2-bromo-3,4hexanedione with thioacetamide will yield 2,5-dimethyl-4-propionylthiazole.

It will be understood by those skilled in the art that the intermediate and the final products prepared herein are neutralized, washed, and dried to obtain the desired substances. The novel thiazoles can be obtained in purer form or in substantially pure form by conventional purification techniques. Thus, the products can be purified and/or isolated by distillation, extraction, crystallization, preparative chromatographic techniques, and the like. It has been found desirable to purify the thiazole by fractional distillation under vacuum.

It will be appreciated from the present disclosure that the substituted thiazoles and mixtures thereof according to the present invention can be used to alter, vary, fortify, modify, enhance or otherwise improve the flavor of a wide variety of materials which are ingested, consumed, or otherwise organoleptically sensed.

The term "alter" in its various forms will be understood herein to mean the supplying or imparting a flavor character or note to an otherwise bland, relatively tasteless substance, or augmenting an existing flavor characteristic wherein the natural flavor is deficient in some regard, or supplementing the existing flavor impression to modify organoleptic character.

Such thiazoles are accordingly useful in flavoring compositions. A flavoring composition is taken to mean one which contributes a part of the overall flavor impression by supplementing or fortifying a natural or artificial flavor in a material or one which supplies substantially all the flavor and/or aroma character to consumable article.

The term "foodstuff" as used herein includes both solid and liquid ingestible materials for man or animals, which materials usually do, but need not, have nutritional value. Thus, foodstuffs includes meats, gravies, soups, convenience foods, malt, alcoholic, and other beverages, milk and dairy products, seafoods including fish, crustaceans, mollusks, and the like, candies, vegetables, cereals, soft drinks, snacks, dog and cat foods, other veterinary products, and the like.

The term "tobacco" will be understood herein to mean natural products such as, for example, burley, Turkish tobacco, Maryland tobacco, flue-cured tobacco and the like including tobacco-like or tobacco-based products such as reconstituted or homogenized leaf and the like, as well as tobacco substitutes intended to replace natural tobacco, such as lettuce and cabbage leaves and the like. The tobaccos and tobacco products include those designed or used for smoking such as in cigarette, cigar, and pipe tobacco, as well as products such as snuff, chewing tobacco, and the like.

When the thiazoles of this invention are used in a flavoring composition, they can be combined with conventional flavoring materials or adjuvants. Such coingredients or flavoring adjuvants are well known in the art for such use and have been extensively described in the literature. Apart from the requirement that any such adjuvant material be ingestibly acceptable, and thus non-toxic or other non-deleterious, conventional materials can be used and broadly include other flavor materials, vehicles, stabilizers, thickeners, surface active agents, conditioners, and flavor intensifiers.

Such conventional flavoring materials include saturated, unsaturated, and amino acids; alcohols, including primary and secondary alcohols; esters; carbonyl compounds including ketones and aldehydes; lactones; other cyclic organic materials including benzene derivatives, alicyclics, other heterocyclics such as furans, pyridines, pyrazines, and the like; sulfur-containing materials including thiols, sulfides, disulfides and the like; proteins; lipids; carbohydrates; so-called flavor potentiators such as monsodium glutamate, guanylates, and inosinates; natural flavoring materials such as cocoa, vanilla, and caramel; essential oils and extracts such as anise oil; clove oil, and the like; artificial flavoring materials such as vanillin; and the like.

Stabilizers include preservatives such as sodium chloride, and the like, antioxidants such as calcium and sodium ascorbate, ascorbic acid, butylated hydroxyanisole, butylated hydroxytoluene, propyl gallate and the like, sequestrants such as citric acid, EDTA, phosphates, and the like.

Thickeners include carriers, binders, protective colloids, suspending agents, emulsifiers and the like, such as agar-agar, carrageenan, cellulose and cellulose derivatives such as carboxymethyl cellulose and methyl cellulose, natural and synthetic gum such as gum arabic, gum tragacanth, and the like, and other proteinaceous materials, lipids, carbohydrates, starches, and pectins.

Surface active agents include emulsifying agents such as mono- and/or diglycerides of fatty acids such as capric acid, caprylic acid, palmitic acid, myristic acid, stearic acid, oleic acid, and the like, lecithin, defoaming and flavor-dispersing agents such as sorbitan monostearate, potassium stearate, hydrogenated tallow alcohol, and the like.

Conditioners include compounds such as bleaching and maturing agents such as benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents such as sodium acetate, ammonium bicarbonate, ammonium phosphate, citric acid, lactic acid, vinegar and the like; colorants such as carminic acid, cochineal, turmeric, curcumin and the like; firming agents such as aluminum sodium sulfate, calcium chloride and calcium gluconate; texturizers; anti-caking agents such as aluminum calcium sulfate and tribasic calcium phosphate; enzymes; yeast foods such as calcium lactate and calcium sulfate; nutrient supplements such as iron salts including ferric pyrophosphate, ferrous gluconate and the like, riboflavin, vitamins, zinc sources such as zinc chloride, zinc sulfate, and the like.

The substituted thiazoles, or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The thiazoles can be incorporated with the carriers by conventional means such as spray-drying, drum-drying, and the like. Such carriers can also include materials for coacervating the thiazoles (and other flavoring ingredients, as present) to provide encapsulated products. When the carrier is an emulsion, the flavoring composition can also contain emulsifiers such as mono- and diglycerides of fatty acids and the like. With these carriers or vehicles the desired physical form of the composition can be prepared.

It will be understood by those skilled in the art that the thiazole derivatives can be added to the production of the finished product. Thus, when the thiazoles are used to alter or otherwise vary the flavor of a foodstuff, they can be added in the original mixture, dough, emulsion, batter, or the like prior to any cooking or heating operation. Alternatively, they can be added at a later stage of processing if volatilization losses would be excessive during the earlier processing.

When the materials are used to treat tobacco products, for example, the additive can be applied in a suitable manner, as by spraying, dipping, or otherwise. The thiazoles can be applied during the "casing" or final spray treatment of the tobacco, or they can be applied at some earlier stage of curing or preparation. The quantity of thiazoles or mixtures thereof utilized should be sufficient to impart the desired flavor characteristic to the product, but on the other hand, the use of an excessive amount of the thiazoles is not only wasteful and uneconomical but in some instances too large a quantity may unbalance the flavor or other organoleptic properties of the product consumed. The quantity used will vary depending upon the ultimate foodstuff, tobacco product, or other consumable product; the further process or treatment steps to which the product will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff, tobacco, or other consumable material.

It is preferred that the ultimate compositions contain from about 0.0001 part per million (ppm) to about 50 ppm of the thiazoles of this invention. More particularly in food compositions it is desirable to use from about 0.005 to about 10 ppm and in certain preferred embodiments of the invention, from about 0.007 to about 10 ppm of such thiazoles are included in the finished product. On the other hand, tobacco compositions can contain as little as 0.1 ppm and as much as 100 ppm, depending upon whether a cigarette tobacco, a pipe tobacco, a cigar tobacco, a chewing tobacco, or snuff is being prepared.

The amount of thiazole or thiazoles to be utilized in the flavoring composition can be varied over a wide range depending upon a particular quality to be added to the foodstuff, tobacco, or other consumable material. Thus, amounts of one or more substituted thiazoles according to the present invention from about 0.1 percent up to 80 or 90 percent can be incorporated in such compositions. It is generally found to be desirable to include from about 0.5 to about 25% of the thiazoles in such compositions.

The thiazoles of this invention are useful individually or in admixtures as fragrances. They can be used to contribute a variety of fragrances. As olfactory agents the thiazoles of this invention can be formulated into or used as components of a "perfume composition".

The term "perfume composition" is used herein to mean a mixture of organic compounds, including, for example, alcohols, aldehydes, ketones, nitriles, esters, and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh smelling materials.

In perfume composition the individual component will contribute its particular olfactory characteristics, but the overall effect of the perfume composition will be the sum of the effect of each ingredient. Thus, the individual compounds of this invention, or mixtures thereof, can be used to alter the aroma characteristics of a perfume composition, for example, by high-lighting or moderating the olfactory reaction contributed by another ingredient in the composition.

The amount of the compounds of this invention which will be effective in perfume compositions depends on many factors, including the other ingredients, their amounts, and the effects which are desired. It has been found that perfume compositions containing as little as 2% of the thiazole of this invention, or even less, can be used to impart a scent to soaps, cosmetics, and the other products. The amount employed can range up to 50% or higher and will depend on considerations of cost, nature of the end product, the effect desired on the finished product and the particular fragrance sought.

The thiazoles of this invention can be used alone or in a perfume composition as an olfactory component in detergents and soaps; space odorants and deodorants; perfumes; colognes; toilet waters; bath preparations such as bath oil and bath salts; hair preparations such as lacquers, brilliantines, pomades, and shampoos; cosmetic preparations such as creams, deodorants, hand lotions, and sun screens; powders such as talcs, dusting powders, face powder, and the like. When used as olfactory component of a perfumed article, as little as 0.01% of one or more of the thiazoles will suffice to impart a nut-like or vegetable-type aroma. Generally, no more than 0.3% is required.

In addition, the perfume composition or fragrance composition can contain a vehicle or carrier for the thiazoles alone or with other ingredients. The vehicle can be a liquid such as alcohol, glycol, or the like. The carrier can be absorbent solid such as a gum or components for encapsulating the composition.

Unless otherwise indicated, all parts, percentages, proportions, and ratios herein are by weight.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 4-Methyl-4-Acetylthiazole

A solution of 30.8 g (0.28 mole) of ammonium dithiocarbamate in 80 cc of absolute methanol is cooled to 0° to −5° C in a dry ice-isopropanol bath, and 25 g (0.25 mole) of 3-chloro-2,4-pentanedione is added dropwise. The resulting reaction mixture is then permitted to set at room temperature overnight.

The reaction mixture is thereupon refluxed for one hour on a steam bath, the solvent is evaporated, 25 ml. of distilled water is added, and the precipitate is removed, by filtration to yield 21.2 g of 2-mercapto-4-methyl-5-acetylthiazole.

Fourteen grams of the mercaptothiazole so obtained is dissolved in 48 g of concentrated hydrochloric acid while the mixture is cooled in an ice bath, and 27.2 g of 30% hydrogen peroxide is added dropwise. The mixture is stirred during the peroxide addition and the temperature is maintained at 60°-70° C. After addition is complete the reaction mixture is stirred for an additional ten minutes, and 30 g of sodium hydroxide pellets are slowly added until the pH is 8. The contents are then extracted five times with 100 ml portions of ether and the combined extracts are dried over sodium sulfate. The dried material is filtered, the solvent is removed by evaporation, and the residue is distilled to collect the colorless liquid boiling at 97° - 99° C at 9 mm Hg.

The resulting 4-methyl-5-acetylthiazole is 99.8 percent pure by gas chromatography. The mass spectrum of this compound exhibits the following m/e characteristics, in order of decreasing abundance: 126, 141, 43, 45, 71, 98. The product has an earthy, peanut odor and a sulfury, roasted nut flavor with a bitter metallic aftertaste. Its threshold level is about 0.05 ppm, and the use level, about 2–5 ppm.

EXAMPLE II

Preparation of 4-Methyl-5-Ethylthiazole

A solution is prepared by dissolving 36.0 g (0.328 mole) of ammonium dithiocarbamate in 50 ml of absolute methanol. This solution is cooled in a dry ice-isopropanol bath to 0° to −5° C, and 26.5 g (0.22 mole) of 3-chloro-2-pentanone is added dropwise with stirring. The mixture is then allowed to stand overnight at room temperature.

The reaction mixture is thereupon refluxed for one hour on a steam bath, and the color changes from orange to blood red. The solvent is evaporated and the residue is taken up with 250 ml of distilled water. The resulting crystals are filtered off to yield 31.5 g of 2-mercapto-4-methyl-5-ethylthiazole.

To 96 g of concentrated hydrochloric acid cooled in an ice bath is added 25.6 g of the foregoing mercaptothiazole. The temperature of the resulting mixture is then maintained at 60° - 70° C while 54.4 g of 30% hydrogen peroxide is added dropwise. After the addition is completed 50 g of sodium hydroxide pellets are added to raise the pH to 8, and the mixture is extracted five times with 100 ml portions of ether.

The combined ether extracts are placed in a rotary evaporator to remove the solvent, and the residue is distilled at 25 mm Hg. The fraction distilling at 74° - 78° C is redistilled at 74° - 78° C and 25 mm Hg to yield 4-methyl-5-ethylthiazole as a colorless liquid.

The product has a very green, dry, earthy flavor reminiscent of unroasted nuts.

The threshold level is about 0.02 ppm, and the use level, about 0.2–1 ppm. In chicken broth at 1 ppm, it accentuates the parsley flavor.

EXAMPLE III

Preparation of Trimethylthiazole

A 250 ml flask fitted with mechanical stirrer, addition funnel, and dry ice condenser is charged with 25 ml of dry benzene, 14.5 g (0.25 mole) of acetamide, and 13.32 g (0.06 mole) of phosphorous pentasulfide. After heating the flask contents on a steam bath for five minutes, 30 g (0.2 mole) of 3-bromo-2-butanone are added dropwise with continued stirring.

The reaction mixture is then heated on a steam bath to get an exothermic reaction started and then removed from the bath. After the bromobutanone addition is complete, the reaction mixture is refluxed for one-half hour, 100 ml of water is added, the mixture is stirred for an additional hour, after cooling the phases are separated in a separatory funnel, and the aqueous phase is isolated.

This lower aqueous layer is made alkaline with 5N sodium hydroxide solution and extracted four times with 100-ml volumes of ether. The ether extracts are dried over sodium sulfate, filtered, and evaporated. The residue is distilled at 29° C and 0.8 mm Hg. The distilled product is then redistilled at 41° C and 2.2 mm Hg to provide 8.3 g of colorless liquid trimethylthiazole. The mass spectrum shows a fragmentation pattern in decreasing order of ion abundance: m/e 127, 86, 71, 59, 85 and 27.

The product is described as characteristic of dark chocolate with additional suitability for coffee, caramel, and related flavors. The threshold level in this context is said to be 0.050 ppm with a use level at 0.2 to 0.5 ppm. It is also described as having a sweet, light green character at 1 ppm in water; sweet, green having a weedy aftertaste at 2 ppm; and strong, fresh stringbean-green with astringent and bitter aftertaste and a light sharp note such as found in Chinese mustard at 5 ppm. In chicken broth at 1 ppm it sharpens the broth and impoves it slightly.

EXAMPLE IV

Preparation of 2,4-Dimethyl-5-Acetylthiazole

A 250 ml three-necked flask fitted with a mechanical stirrer, addition funnel with drying tybe, and dry ice condenser with drying tube is charged with 25 ml of benzene, 14.5 g (0.25 mole) of acetamide, and 13.32 (0.06 ml) of phosphorus pentasulfide. The mixture is refluxed for one minute, and 27.8 g (0.22 mole) of 3-chloro-2,4-pentanedione is slowly added with stirring. The resulting mixture is heated on a steam bath to initiate the reaction, and the bath is removed.

The reaction mixture is refluxed for one-half hour, 100 ml of distilled water is added, the stirring is continued for one-half hour, and the resulting mixture is placed in a separatory funnel. The lower acidic aqueous layer is separated and made alkaline with 5N sodium hydroxide solution, whereupon the color changes from red to reen. The alkaline mixture is extracted four times with 200 ml portions of ether, dried over sodium sulfate, filtered, evaporated to reduce its volume, and distilled at reduced pressure.

The dimethylacetylthiazole product is a yellow liquid boiling at 108° - 110° C at 15 mm Hg and its mass spectrum exhibits the following fragmentation pattern (in order of decreasing abundance): m/e 43, 155, 140, 45, 71, and 112. It is characterized as having fragrance notes like Buccu Leaf oil. It is suitable for meat and outstanding for cooked veal and beef liver taste. Its threshold level is about 0.2 ppm, and the use level is about 2 - 5 ppm.

It is also characterized as having the sulfur odor notes of meat, dark meat of chicken and turkey, and boiled beef. At 1 ppm in water it has a sweet taste with an aftertaste of boiled beef. In chicken broth at 1 ppm it sweetens and slightly improves the flavor; at 3 ppm, it sweetens and intensifies the boiled fowl character. It is useful for beef, chicken, and turkey flavors, anise and licorice, and nut flavors.

EXAMPLE V

Preparation of 2,4-Dimethyl-5-Ethylthiazole

A three-necked 250 ml flask equipped with stirrer, dry ice condenser, and addition funnel is charged with 14.5 g (0.25 mole) of acetamide and 13.35 g (0.06 mole) of phosphorus pentasulfide dissolved in 25 ml of anhydrous benzene, and 38.1 g (0.25 mole) of 3-chloro-2-pentanone (81% pure) is added dropwise during a one-half hour period with continuous stirring. The flask is initially heated on a steam bath to start the exothermic reaction.

The mixture is then refluxed for one-half hour, 100 ml of water is added, and the aqueous mixture is stirred for one-half hour. The mixture is then separated into two phases in a separatory funnel, and the lower aqueous phase is made alkaline with 5N aqueous sodium hydroxide. The alkaline aqueous phase is thrice extracted with 200 ml portions of ether, the extracts are dried over sodium sulfate, the dried extract is filtered and evaporated down.

The crude residue is distilled at 49° - 50° C at 2.4 mm Hg and redistilled at 49° - 50° C under 1.6 mm Hg to yield 7.4 g. of dimethylethylthiazole as a colorless liquid. In decreasing order of m/e occurrence, mass spectral analysis shows the following fragmentation pattern: 126, 141, 85, 45, and 113.

This material is characterized as being similar to 2,4-dimethyl-5-acetylthiazole. Its liver character is more baked and roasted. The threshold level is about 0.002 ppm and the use level, about 0.020 ppm. Also characterized as green-vegetable and meaty, its odor is said to be powerful, black current, Buccu oil.

EXAMPLE VI

Preparation of 2-Methyl-5-Methoxy-4-Isobutylthiazole

A one-liter three necked flash equipped with a stirrer, condenser, and heating mantle is charged with 10 g (0.052 mole) of N-acetylleucine methyl ester and 14.5 g (0.062 mole) of phosphorus pentasulfide in 250 ml of chloroform, and the reaction mixture is refluxed for 24 hours while care is taken to exclude moisture. The reaction mixture is then cooled and made basic with 200 ml of 10% potassium hydroxide.

The aqueous and chloroform layers are then separated and the chloroform layer is washed with water. The chloroform solution at this point has the aroma of green peppers. The chloroform layer is dried over sodium sulfate and filtered, and the solvent is evaporated. The product is distilled at 69° - 70° C and 2.2 mm Hg to yield 5.9 g of product. It is then redistilled to obtain 4.8 g of colorless liquid 2-methyl-5-methoxy-4-isobutylthiazole which gas chromatographic analysis shows to be 98.2% pure. Mass spectral analysis shows the following fragmentation pattern in decreasing order of m/e abundance: 142, 101, 185, 57, 41.

This material is characterized in aqueous solution as having a vegetable soup odor with notes of barley, potato, green pepper, and onion. In chicken broth at 0.010 ppm it intensifies the root vegetable flavors notes; at 0.030 ppm it adds cooked green pepper flavor. The threshold level is estimated at 0.0002 ppm with use levels of 0.05 to 0.1 ppm. At 0.05 ppm in sugar water it has a definite carrot taste.

EXAMPLE VII

Preparation of 4-Isobutyl-5-Methoxythiazole

A 500 ml flask equipped with heating mantle, condenser, and drying tube is charged with 27.25 g (0.125 mole) of phosphorus pentasulfide, 17.3 g (0.1 mole) of N-formylleucine methyl ester, and 250 ml of chloroform, and the contents are refluxed for 24 hours. The reaction mixture is thereupon cooled to room temperature, washed with 250 ml of 10% potassium hydroxide, and then washed with 250 ml of distilled water.

The chloroform layer is separated from the aqueous layer and dried over sodium sulfate. At this point the chloroform layer has the aroma of green peppers. The chloroform is then evaporated.

The residue is distilled at 55° - 60° C and 1.1 mm Hg, and then redistilled at 92° - 93° C and 10 mm Hg to provide 5.6 g of methoxyisobutylthiazole as a colorless liquid. Mass spectral analysis shows a fragmentation pattern in decreasing order of m/e abundance as follows: 128, 129, 101, 45, 171.

This material has an odor in 1% alcoholic solution of fresh sliced onion in vinegar with a green pepper character. At 0.1 ppm in chicken broth it pleasantly acents the green vegetable notes such as parsley. It is suitable for dips, salad dressing, relish dishes, and soups. It is useful for a wide range of green vegetable flavor notes, e.g., peas and beans. Its use level is estimated as 0.01 to 0.05 ppm. Its odor has also been characterized as vegetable compote and minestrone, with a mixture of green pepper, onion, celery, and black pepper.

EXAMPLE VIII

Preparation of 2-Methyl-5-Methoxythiazole

A mixture of 5.7 g (0.043 mole) of N-acetylglycine methyl ester and 11 g (0.055 mole) of phosphorus pentasulfide in 100 ml of chloroform is refluxed for 24 hours with care taken to exclude moisture. The chloroform layer is then made basic with 10% aqueous potassium hydroxide, washed with 100 ml of distilled water, dried over sodium sulfate, and filtered. The chloroform is then evaporated from the filterate.

The residue is distilled at 33° C and 0.5 mm Hg to yield 1.2 g of methoxymethylthiazole as a colorless liquid. Mass spectral analysis of the compound shows the following fragmentation pattern in order of decreasing m/e abundance: 129, 45, 59, 88, 73.

It has a green, nut-like, vegetable aroma with a dominating sweet, metallic, cooked broccoli-cabbage note. When tasted at 10 ppm in water, it has a sweet cabbage-like flavor with a light burning aftertaste.

*EXAMPLE IX*

*Preparation of 4,5-Dimethylthiazole*

*A mixture of 21.4 g of ammonium dithiocarbonate and 45 ml of absolute methanol is prepared and cooled in an ice bath, and 29.4 g of 3-bromo-2-butanone is added dropwise with stirring. After the addition is complete, the reaction mixture is permitted to stand overnight at room temperature, and then to remain in a steam bath for 1 hour.*

*The solvent is evaporated off, the residue is extracted with 100 ml of distilled water, and the precipitate is filtered off to yield 16.6 g of 4,5-dimethyl-2-mercaptothiazole. A 16.4 g portion of the mercaptothiazole is placed in 37.5 g of concentrated hydrochloric acid in an ice bath, and 38.9 g of 30% hydrogen peroxide is added with stirring. The reaction temperature is held at 65° - 70° C during the addition.*

*After the addition is complete the mixture is heated on a steam bath at 70° C for 5 minutes and cooled in an ice bath, and 47.5 g of sodium hydroxide pellets are added to make the solution basic. The basic solution is extracted 5 times with 100 ml portions of ether, the ether extract is dried over sodium sulfate, and the ether is removed by evaporation.*

*The residue is distilled at atmospheric pressure and redistilled at 50° C and 7 mm Hg to yield 7.0 g of 96.5% pure material. This material is again redistilled at 116° C and 20 mm Hg to yield 5.8 g of 4,5-dimethylthiazole as a colorless liquid. Gas chromatographic analysis shows it to be 98.4% pure. Mass spectral analysis shows a fragmentation pattern, in order to decreasing m/e intensity, as follows: 113, 71, 45, 86, 85, 27. It has a nut-like braised meat flavor. A blotter dipped in a 5% ethanolic solution of 4,5-dimethylthiazole has a sweet, nut-like odor intensifying to a roasted peanut shell character and, on airing leaves a boiled meat and poultry note. When tasted in water at 1 ppm it has a note characteristic of boiled beef and veal. When added to chicken broth at 1 ppm the thiazole intensifies the chicken flavor.*

EXAMPLE [IX] *X*

Preparation of 4-Acetylthiazole

A 250 ml three-neck flask equipped with a stirrer, thermometer and addition funnel is charged with 25 g (0.29 mole) of thioformamide and 50 ml of dry ethanol and cooled to 5° C. Then 41 g of 1-bromo-2,3-butanedione (containing a considerable amount of 1,4-dibromo-2,3-butanedione) is added dropwise with stirring and cooling so that the temperature remains below 20° C.

The reaction mixture is held under refrigeration overnight and the crystals (20.2 g) which are deposited are collected by filtration. The crystalline material is subject to sublimation, and 0.95 g of material is collected which, on resublimation, yields 0.3 g of white crystalline 4-acetylthiazole.

By mass spectroscopy, the product exhibits the following m/e fragmentation pattern: 112, 127, 43, 45, 57, 84. A one percent ethanolic solution has a good baked bread flavor, followed by green, slightly meaty flavor notes. At 1 ppm in water it has a light roast nut flavor and light astringency; at 3 ppm, a sweet, roasted nut somewhat reminiscent of chestnut and walnut skins; at 5 ppm, the same flavor as at 3 ppm, but with light bitter aftertaste. At 3 ppm in chicken broth is depresses the vegetable notes and intensifies the roasted chicken meat notes; at 3 ppm in hot chocolate, it introduces a sour milk note.

EXAMPLE [X] *XI*

Preparation of 4-Methoxythiazole

A 500 ml three-neck flask fitted with a stirrer, condenser, and heating mantle is charged with 10.4 g (0.089 mole) of N-formylglycine methyl ester, 20 g, (0.091 mole) of phosphorus pentasulfide, and 100 ml of chloroform. The reaction mixture is heated under reflux for 24 hours while care is taken to exclude moisture, cooled, and made basic by the addition of 350 ml of 10% potassium hydroxide solution.

The aqueous and chloroform layer are then separated and the chloroform layer is washed with water. The chloroform solution is dried over sodium sulfate, filtered and the solvent evaporated. The residue is distilled under reduced pressure and 5 -methoxythiazole (0.4 g) is obtained as a colorless liquid with boiling point of 27° C at 0.9 mm Hg. Gas chromatographic analysis shows the product to be 90% pure.

The mass spectrum of the product has the following fragmentation pattern, in order of decreasing m/e abundance: 115, 45, 57, 88, 72, 100. This thiazole has a roast meat, fried onion, roast vegetable flavor. It is suitable for all types of vegetable flavors, particularly onion and leek. the use level is about 0.1 ppm.

EXAMPLE [XI] *XII*

Preparation of 2-Ethoxythiazole

A 250 ml single-neck flash equipped with a condenser and heating mantle is charged with 11.9 g (0.1 mole) of 2-chlorothiazole, 7 g (0.1 mole) of sodium ethoxide, and 100 ml of absolute ethanol, and the mixture is heated under reflux for one hour. After cooling, 100 ml of water is added and the solution extracted thrice with 100 ml of diethyl ether. The combined ether extracts are dried over anhydrous sodium sulfate, filtered, and the solvent evaporated.

The residue is distilled under reduced pressure and the 2-ethoxythiazole is obtained as a colorless liquid with a boiling point of 32 – 33° C at 2 mm Hg in a yield of 3.5 g.

The mass spectrum of the product exhibits the following m/e fragmentation pattern: 101, 73, 129, 45, 46, 56. Evaluated as an 2.5 percent ethanol solution, this material has a strong burnt, over-roasted meat odor which, upon drying, changes to the sweet fruity character of roasted onions. The odor is also described as meaty with a tomato leaf, bay leaf, minty character. In a 0.2 ppm aqueous solution it has a general roasted character, especially suggestive of roasted meat or pot roast. At 0.5 ppm in aqueous solution, the flavor notes of cooked vegetables and cabbage are present. This product has value in meat, milk, cream, vanilla, maple, butterscotch, caramel, roasted nut, and cooked vegetable (onion, cabbage) flavors. The threshold level is about 0.1 ppm, and the use level is 0.2 to 0.5 ppm.

EXAMPLE [XII] *XIII*

Preparation of 2-Methoxythiazole

A 250 ml single-neck flask equipped with a condenser and heating mantle is charged with 5.9 g (0.05 mole) 2-chlorothiazole, 50 ml of dry methanol, and 5.4 g (0.05 mole) of sodium methoxide, and the mixture is heated under reflux for one hour. After cooling the solvent is evaporated on a rotary evaporator, and the residue obtained is dissolved in 100 ml of distilled water and extracted thrice with 11 ml of diethyl ether. The combined ether extracts are dried over anhydrous sodium sulfate, filtered, and the solvent evaporated The residue obtained is distilled under vacuum, and the 2-methoxythiazole (1.3 g) is obtained as a colorless liquid with a boiling point of 22° C at 1.8 mm Hg. Gas chromatographic analysis shows the product is 98.3% pure.

The mass spectrum of the product shows the following m/e fragmentation pattern: 115, 56, 45, 100, 58.

The odor of 2-methoxythiazole, when evaluated on a blotter, is described as nutty, meaty, and fugitive. When evaluated in water it has a pleasant cereal, bread, caramel flavor reminiscent of methoxy pyrazine and a bitter aftertaste.

EXAMPLE [XIII] *XIV*

Preparation of 2-Methyl-4-isobutyl-5-Ethoxythiazole

A one liter three-neck flask equipped with a stirrer, condenser, and heating mantle is charged with 31.4 g (0.156 mole) of N-acetylleucine ethyl ester, 34.7 g (0.156 mole) of phosphorus pentasulfide, and 250 ml of chloroform, and the mixture is heated under reflux for 24 hours while care is taken to exclude moisture. The reaction mixture is then cooled and made basic with 10% aqueous potassium hydroxide.

The aqueous and chloroform layer are separated, and the chloroform layer is washed with water. The chloroform solution is dried over sodium sulfate, filtered, and the solvent evaporated.

The residue is distilled at 126 – 127° and 30 mm Hg to yield 17.1 g of the methylisobutylethoxythiazole as colorless liquid.

The mass spectrum of 2-methyl-4-isobutyl-5-ethoxythiazole exhibits the following m/e fragmentation pattern, in order of decreasing order of m/e abundance: 59, 128, 156, 199, 27, 29. The product has a fatty, sour, green vegetable flavor with specific notes of onion, cucumber, pickle, and green fruit such as green apples. When evaluated at 1 ppm in water it has a green and tarlike character and an astringent, bitter taste. The threshold is about 0.02 ppm and its use level is about 0.5 ppm.

EXAMPLE [XIV] *XV*

Preparation of 4-Isobutyl-5-ethoxythiazole

A one liter three-neck flask equipped with a stirrer, condenser, and heating mantle is charged with 13.5 g (0.0725 mole) of N-formylleucine ethyl ester, 16.1 g (0.0725 mole) of phosphorus pentasulfide, and 250 ml of chloroform. The mixture is heated under reflux for 24 hours while care is taken to exclude moisture, cooled, and made basic by the addition of approximately 400 ml of 10% aqueous potassium hydroxide solution.

The aqueous and chloroform layers are then separated and the chloroform layer is washed with water. The chloroform solution is dried over sodium sulfate, filtered and the solvent evaporated. The residue is distilled to yield two fractions: fraction 1 (5.8 g) with b.p. 129 – 131° C at 35 mm Hg and fraction 2 (1.0 g) with b.p. 131 – 134° C at 35 mm Hg. The two fractions are combined and, on redistillation, the 4-isobutyl-5-ethoxythiazole is obtained as a colorless liquid with b.p. 80 – 81° C at 10 mm Hg.

The mass spctrum of 4-isobutyl-5-ethoxythiazole exhibits the following m/e fragmentation pattern: 114, 142, 45, 27, 29, 185. The product has a powerful cucumber, green pepper, onion, earthy aroma.

When tasted in water 4-isobutyl-5-ethoxythiazole has the following flavor characteristics:

At 0.00001 ppm, characteristic vegetable taste and notes found in fresh hazelnut hearts.

At 0.00002 ppm, notes of cucumber pickles and notes of raw potato.

At 0.1 – 1 ppm, pleasant lingering cucumber, string bean flavor.

This product is useful in green vegetable flavor such as string bean, green pepper, cucumber and onions, also it conveys the green notes in fruits especially green plums, watermelon, tomato and hazelnut. The threshold is about 0.000002 ppm and the use level 0.00001 to 0.1 ppm.

EXAMPLE [XV] *XVI*

Preparation of 5-Ethoxythiazole

A 2-liter three-neck flask fitted with a stirrer, condenser, and heating mantle is charged with 31 g (0.236 mole) of N-formylglycine ethyl ester, 53.5 g (0.24 mole) of phosphorus pentasulfide, and 400 ml of chloroform. The reaction mixture is heated under reflux for 24 hours, while moisture is excluded, thereupon cooled and made basic by the addition of one liter of 10% potassium hydroxide solution.

The aqueous and chloroform layers are then separated, and the chloroform layer is washed with water, dried over sodium sulfate, and filtered and the solvent is evaporated, the residue is distilled under reduced pressures, and 5-ethoxythiazole is obtained as a colorless liquid with a boiling point of 94 – 96° C at 30 mm Hg. In order of decreasing m/e abundance, mass spectroscopy shows the following fragmentation pattern: 45, 29, 101, 27, 74, 73, 129. It has a green, nut-like, cooked vegetable flavor reminiscent of onion and cabbage.

EXAMPLE [XVI] *XVII*

A basic cocoa flavor material is prepared by admixing the following ingredients:

| Ingredient | Amount (Parts) |
|---|---|
| Maltol | 3.0 |
| Acetaldehyde (50% in ethanol) | 20.0 |
| Isobutyraldehyde | 16.0 |
| Isovaleraldehyde | 42.5 |
| Benzyl alcohol | 10.0 |
| Methyl sulfide | 0.4 |
| methyl disulfide | 0.4 |
| Isobutyl acetate | 0.1 |
| Isoamyl acetate | 0.2 |
| Phenylethyl acetate | 0.6 |
| Diacetyl 10% (in alcohol) | 0.3 |
| Acetophenone | 1.0 |
| Furfural 10% (in alcohol) | 1.0 |
| Benzaldehyde | 1.0 |
| Isoamylalcohol | 0.5 |
| Phenylethyl alcohol | 3.0 |

A chocolate-like flavor note material is prepared with the following ingredients:

| Ingredient | Amount (Parts) |
|---|---|
| 2,4,5-Trimethylthiazole | 50 |
| 2,4-Dimethyl-5-acetylthiazole | 5 |
| 2,4-Dimethyl-5-ethylthiazole | 10 |
| 2,3,5,6-Tetramethylpyrazine | 35 |

One part by weight of the chocolate-like flavor note material is intimately admixed with 99 parts of the basic cocoa flavor material. The resulting mixture is then diluted with propylene glycol to formulate a 10% propylene glycol solution. The propylene glycol solution is then added to an "instant" chocolate-flavored beverage powder at the rate of 0.2% to provide a characteristic dark chocolate taste.

EXAMPLE [XVII] *XVIII*

To a portion of essentially flavorless salad dressing, 4-isobutyl-5-methoxythiazole is added at the rate of 0.020 ppm. The resulting mixture has a characteristic cucumber, spiced pickle note. The salad dressing is a mixture of the following:

| Ingredient | Parts |
|---|---|
| Black Pepper oil | 3 |
| Nutmeg oil | 3 |
| Celery oil | 3 |
| Lemon oil | 3 |
| Mustard oil | 1 |
| Vinegar-citric acid (50:50 mixture) | 120 |
| Starch paste prepared from tapioca flour-water (50:50 mixture) | 300 |
| Liquid egg yolks | 210 |
| Sodium chloride | 7 |
| Sucrose | 10 |
| Mustard | 20 |
| Locust Bean gum | 6 |

EXAMPLE [XVIII] *XIX*

An imitation cheese flavor is formed by mixing the following ingredients:

| Ingredient | Parts |
|---|---|
| Butylbutyryllactate | 2.0 |
| iso-Valeric acid | 2.0 |
| Ethyl butyrate | 2.0 |
| Butyric acid | 2.0 |

-continued

| Ingredient | Parts |
|---|---|
| Caproic acid | 1.0 |
| Methyl namyl ketone | 1.0 |
| Ethyl alcohol (95% aqueous solution) | 10.0 |
| Propylene glycol | 80.0 |

To the foregoing cheese flavor is added $10^{-4}$ parts of 4-isobutyl-5-methoxythiazole.

The foregoing mixture is then added to cacciacavallo cheese in the ratio of one part flavor to 180 parts of cacciacavallo cheese. The resulting blend is heated to a molten mixture (at 90° C) and then quick-chilled at −20° C over a period of one hour. The resulting cheese has a delicious pickle-cucumber note.

EXAMPLE [XIX] *XX*

The following spice oil is prepared:

| Ingredient | Parts |
|---|---|
| Oil of nutmeg | 500.0 |
| Oil of sweet marjoram | 150.0 |
| Oil of pimenta berries | 100.0 |
| Oil of mustard | 12.5 |
| Oil of thyme white | 37.5 |
| Oil of black pepper | 50.0 |
| Oil of cloves | 25.0 |
| Oleoresin of capsicum | 75.0 |
| Oleoresin of ginger, alcoholic | 50.0 |

To the foregoing oil, five parts of the following mixture is added:

| Ingredient | Parts |
|---|---|
| 2,4-dimethyl-5-acetyl thiazole | 4 |
| 2,4-dimethyl-5-ethyl thiazole | 1 |
| Ethyl alcohol (95% aqueous solution) | 95 |

The above material is added to an edible spun synthetic soy-protein (manufactured by Swift & Company) at the rate of 0.02%. The resulting proteinaceous product has a distinct taste reminiscent of freshly broiled calves liver.

EXAMPLE [XX] *XXI*

The following ingredients are refluxed for four hours:

| Ingredient | Parts |
|---|---|
| L-Cysteine hydrochloride | 0.9 |
| Carbohydrate-free vegetable protein hydrolysate | 30.9 |
| Thiamine hydrochloride | 0.9 |
| Water | 67.30 |

The resulting mixture is then aged for three days and an aliquot portion is withdrawn and dried. Based on the weight of the dry solid obtained, sufficient gum arabic is added to the batch to provide a composition containing one part by weight of gum arabic. The composition is then spray-dried.

To the spray-dried material the following mixture is added at the rate of $10^{-6}$ ppm of the mixture:

| Ingredient | Parts |
|---|---|
| 2,4-Dimethyl-5-ethylthiazole | 1.0 |
| 2,4-Dimethyl-5-aceytylthiazole | 1.0 |

The resulting material has an excellent beef liver flavor.

EXAMPLE [XXI] *XXII*

A beef liver gravy is made by formulating a composition in the amounts indicated:

| Ingredient | Parts |
|---|---|
| Cornstarch | 10.50 |
| The spray-dried product of Example XXI | 3.00 |
| Caramel color | .30 |
| Garlic powder | .05 |
| White pepper | .05 |
| Salt | 1.92 |
| Monosodium glutamate | .20 |

To one unit of gravy flavor concentrate, eight ounces of water is added, and the mixture is stirred thoroughly to disperse the ingredients brought to a boil, simmered for one minute, and served. This "meatless" gravy exhibits an excellent beef-liver flavor.

EXAMPLE [XXII] *XXIII*

The following ground sausage mixture is prepared:

| Ingredient | Parts |
|---|---|
| Ground beef | 200 |
| Beef suet | 120 |
| Ice/NaCl (50:50 mixture) | 200 |
| Potato flour | 100 |
| Anhydrous bread crumbs | 140 |
| Dry milk powder | 20 |
| Standard spice flavor containing: | 10 |
| Oil of cumin | 1.6 |
| Oil of mustard | 3.3 |
| Oil of celery | 3.3 |
| Oil of ginger | 5.2 |
| Oil of cloves | 14.3 |
| Oil of coriander | 17.6 |
| Oil of pimenta berries | 22.0 |
| Oil of black pepper | 43.0 |
| Oleoresin capsicum | 373.0 |
| Oil of nutmeg | 500.0 |

To the above mixture 0.02% by weight of the following mixture is added:

| Ingredient | Parts |
|---|---|
| 2,4-dimethyl-5-ethylthiazole | 4 |
| 2,4-dimethyl-5-acetylthiazole | 1 |
| Ethyl alcohol (95%) | 95 |

The resulting mixture is then formed into a sausage and encased in the usual manner. The encased sausage is heated in water at a temperature of 160 – 180° F for a period of two hours. This sausage has a liver-like taste reminiscent of the taste of sausage made with natural liver.

EXAMPLE [XXIII] *XXIV*

A mixture of 8.8 g of cysteine-hydrochloride, 8.8 g of thiamine hydrochloride, and 309.4 g of carbohydrate-free vegetable protein hydrolysate is brought to a standard weight of 1000 grams by the addition of water, and adjusted to 4.75 pH with acid or base as required. This mixture is then boiled under reflux conditions at atmospheric pressure for four hours and allowed to cool.

After the mixture is allowed to cool one gram of 2-ethoxythiazole is added thereto. The resulting mixture thus obtained has an excellent "pot-roast" meat flavor.

What is claimed is:

[1. A process for altering the organoleptic properties of a consumable material selected from the group consisting of a foodstuff, fragrance composition, and tobacco which comprises adding thereto a small but effective amount of at least one thiazole having the formula:

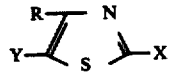

wherein R is hydrogen, acyl or, when X and Y are alkyl, alkyl; X is alkyl, alkoxy, or hydrogen; Y is alkyl, acyl, alkoxy or hydrogen; at least one of R, X, and Y is not hydrogen and when X is alkyl R and Y are not both hydrogen, and X is not hydrogen when R and Y are both alkyl.]

[2. A process according to claim 1 wherein the alkyl alkoxy, and acyl groups contain up to four carbon atoms.]

[3. A process according to claim 1 wherein at least two thiazoles are added.]

[4. A process according to claim 1 wherein the consumable material is a foodstuff.]

[5. A process as defined in claim 1 wherein said consumable material is a fragrance composition.]

[6. A process as defined in claim 1 wherein said consumable material is tobacco.]

[7. A process as defined in claim 1 wherein no more than one hydrogen is substituent on the thiazole ring.]

[8. A process as defined in claim 1 wherein the thiazole is one selected from the group consisting of 4-methyl-5-acetyl thiazole; trimethylthiazole; 2,4-dimethyl-5-acetylthiazole; 2,4-dimethyl-5-ethylthiazole, 2-methyl-5-methoxy-4-isobutylthiazole; 4-isobutyl-5-methoxythiazole; 2-methyl-5-methoxythiazole 4-acetylthiazole; 5-methoxythiazole; 2-ethoxythiazole; 2-methoxythiazole; 2-methyl-4-isobutyl-5-ethoxythiazole; 4-isobutyl-5-ethoxythiazole; and 5-ethoxythiazole.]

[9. A foodstuff comprising an edible material and a small but effective amount of at least one thiazole having the formula:

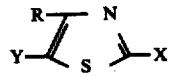

wherein R is hydrogen, acyl or, when X and Y are alkyl, alkyl; X is alkyl, alkoxy, or hydrogen; Y is alkyl, acyl, alkoxy, or hydrogen; at least one of R, X and Y is not hydrogen; and when X is alkyl R and Y are not both hydrogen, and X is not hydrogen when R and Y are both alkyl.]

*10. A process for altering the organoleptic properties of a consumable material selected from the group consisting of a foodstuff, fragrance composition, and tobacco which comprises adding thereto a small but effective amount of at least one thiazole having the formula:*

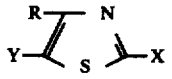

*wherein R is hydrogen, alkyl or acyl; X is alkyl, alkoxy, or hydrogen; Y is alkyl, acyl, alkoxy or hydrogen; at least one of R, X and Y not being hydrogen; with the provisos (a) that X is alkyl only when either (i) R and Y are each alkyl or (ii) Y is alkoxy and (b) that when Y is methoxy, R is alkyl or X is hydrogen.*

*11. A process according to claim 10 wherein the alkyl, alkoxy and acyl groups contain up to four carbon atoms.*

*12. A process according to claim 10 wherein at least two thiazoles are added.*

*13. A process according to claim 10 wherein the consumable material is a foodstuff.*

*14. A process as defined in claim 10 wherein said consumable material is a fragrance composition.*

*15. A process as defined in claim 10 wherein said consumable material is a tobacco.*

*16. A process as defined in claim 10 wherein no more than one hydrogen is substituent on the thiazole ring.*

*17. A process as defined in claim 10 wherein the thiazole is one selected from the group consisting of 4-methyl-5-acetyl thiazole; trimethylthiazole; 2,4-dimethyl-5-acetylthiazole; 2,4-dimethyl-5-ethylthiazole; 2-methyl-5-methoxy-4-isobutylthiazole; 4-isobutyl-5-methoxythiazole; 4-acetylthiazole; 5-methoxythiazole; 2-ethoxythiazole; 2-methoxythiazole; 2-methyl-4-isobutyl-5-ethoxythiazole; 4-isobutyl-4-ethoxythiazole; and 5-ethoxythiazole.*

*18. A foodstuff comprising an edible material and a small but effective amount of at least one thiazole having the formula:*

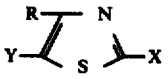

*wherein R is hydrogen, alkyl, or acyl; X is alkyl, alkoxy or hydrogen; Y is alkyl, acyl, alkoxy, or hydrogen; at least one of R, X and Y not being hydrogen; with the proviso (a) that X is alkyl only when either (i) R and Y are each alkyl or (ii) Y is akoxy and (b) that when Y is methoxy, R is alkyl or X is hydrogen.*

* * * * *